Nov. 6, 1951  J. MAHLER  2,574,186
APPARATUS FOR VIEWING STEREOSCOPIC PICTURES
Filed March 4, 1946  2 SHEETS—SHEET 2

INVENTOR
JOSEPH MAHLER
BY
Louis L. Gagnon
ATTORNEY

Patented Nov. 6, 1951

2,574,186

UNITED STATES PATENT OFFICE 2,574,186

APPARATUS FOR VIEWING STEREOSCOPIC PICTURES

Joseph Mahler, Brookline, Mass., assignor to American Optical Company, Southbridge, Mass., a voluntary association of Massachusetts Application March 4, 1946, Serial No. 651,695

5 Claims. (Cl. 88—29)

This invention relates to new and useful improvements on the stereoscopic apparatus described in my Patent No. 1,992,872, February 26, 1935, and more especially to such apparatus as modified for directly viewing stereoscopic pictures formed in light polarizing transparent material, the polarizing axis of the layer of material in which one of said pictures is formed being at right angles to that of the layer in which the other is formed, as more fully described in the patent to Land and Mahler, No. 2,203,687, June 11, 1940, and known as polarizing stereoscopic transparencies.

The object of the present invention is to provide a simple, convenient and portable means whereby an individual may directly view such transparencies in relief.

In the drawings accompanying and forming a part of this specification,

Figs. 1a and 1b are plan views of split field polarizers herein more fully described.

In the particular drawings selected for more fully disclosing the principle underlying my invention, and which are to be considered as illustrative, merely, and not restrictive, 10 represents a casing wherein a disposed near one end thereof a split-field polarizer 11, comprising a light transmitting member, such as a translucent plate 12 having two adjoining polarizing fields 13, 14, the polarization axes of which are at an angle of ninety degrees to each other. The polarizing axes of the fields 13, 14 may be horizontal and vertical, respectively, (Fig. 1a), or may be inclined 45° to the left and right, respectively, of the vertical line dividing the two fields of said polarizer (Fig. 1b).

Figure 2:
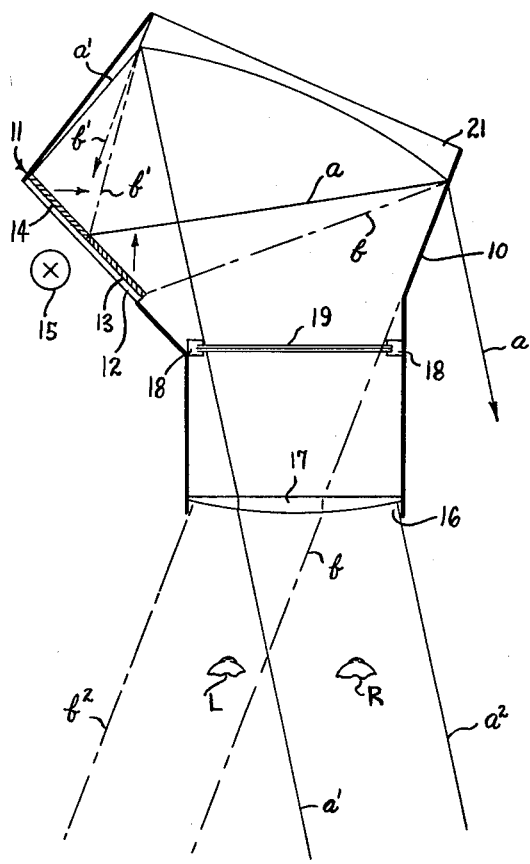
Fig. 2 is a diagrammatic representation of a modification thereof, wherein the focusing means is a reflector.

Between the polarizer and the end of the casing is a source of artificial light, such as an incandescent lamp 15, or, as indicated in Fig. 2, the polarizer may form the outer end of the casing, and, in such case, it may be exposed to any suitable source of illumination, either natural or artificial.

The other end of the casing is provided with an inspection aperture 16, in which a magnifying lens 17 may be placed, if desired. Intermediate the ends of the casing are supports 18 of any suitable sort, for holding a polarizing stereoscopic transparency 19. Suitably associated with the transparency, in the present instance, is a magnifying means, shown in Figure 1 as a refracting lens 20. The split-field polarizer is placed in the focal plane of said lens 20. The magnifying lens 17, if employed, will be so related to the lens 20 as to produce a compound lens therewith. In each case, the polarizer 11 should be so spaced from lens 20 that the two sets of polarized light rays will each pass through the focusing means; that is, the lens 20 of Fig. 1, if the lens 17 thereof is not employed, and the compound lens 17—20 of Fig. 1, if both such lenses are employed, the same constituting a single focusing means.

Figure 1:
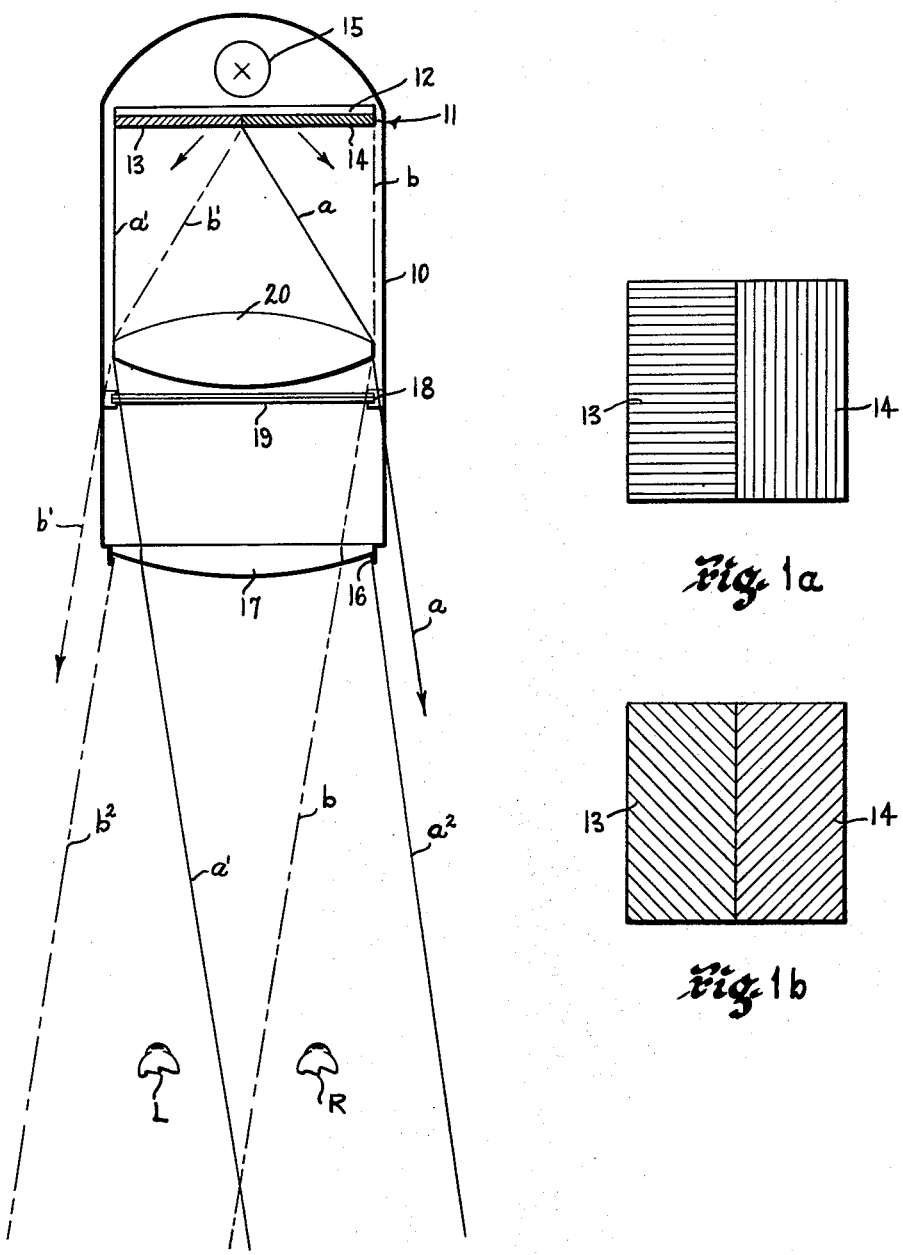
Figure 1 is a diagrammatic representation of a polarizing stereoscopic transparency viewing apparatus embodying my invention wherein the focusing means is a refractor.

When light source 15 is energized a diverging cone of polarized light rays is sent out from each point on the polarizer 11. However, for convenience of illustration, the paths of said diverging cones are traced as a composite beam from each field 13 and 14. Lines $a$ and $a'$ represent the boundaries of the beam starting from field 13 and $b$ and $b'$ represent the boundaries of the beam starting from field 14 of the polarizer. As each of said two composite beams of light pass through lens 20 it is turned in a direction determined by the line from its originating field of the polarizer 11 to the first nodal point of lens 20. Thus, beam $a$—$a'$ is directed to the right and beam $b$—$b'$ to the left. Lens 17 has the effect of decreasing the angle at which said beams $a$—$a'$ and $b$—$b'$ diverge. It will be readily apparent that the extension of the wall of the casing 10 beyond lenses 20 and 17 causes the width of the polarized beams passing through aperture 16 to be somewhat restricted so that beam $a$—$a'$ actually has the width of $a^2$—$a'$ when leaving aperture 16 and beam $b$—$b'$ that of $b^2$—$b'$. It will be readily seen that, although at lens 20 beams $a$—$a'$ and $b$—$b'$ coincide, the effect of the lens is to cause said beams somewhere in space beyond the lens to again assume their separate entity as shown in Fig. 1. Thus, the eyes of the observer may be so spaced from the aperture 16 that when they are directed toward the stereoscopic transparency 19, his eye L will be located within the limits of beam $b^2$—$b'$ and outside beam $a^2$—$a'$ while eye R will be within the limits of beam $a^2$—$a'$ but outside beam $b^2$—$b'$. At said positions, eye L will receive only polarized light from field 14 while his eye R will receive only polarized light from field 13.

The axes of polarization of said fields of the polarizer are so disposed with respect to the polarization axes of the layers of material of the stereoscopic transparency 19 in which are formed the pictures or images making up the polarizing stereoscopic transparencies, that the axis of polarization of one of the images is parallel to the axis of one of the fields of the polarizer 12 and the other normal thereto. Thus, when the eyes are positioned, as above, one eye will see only the picture formed in one of said layers and the other eye will see only the picture formed in the other of said layers, i. e., the polarization axes of the layers of material in which said pictures are formed will each be parallel to the polarization axis of one of the fields of said split-field polarizer and perpendicular to the axis of the other of said fields; for example, the right eye will see only the right eye polarizing stereoscopic transparency picture and the left eye will see only the left eye polarizing stereoscopic transparency picture. Thus, a stereoscopic effect is secured, i. e., the picture will appear to the eye in three dimensions or in relief.

In the modification shown in Fig. 2, the focusing means is the concave mirror 21. It will be obvious that the mode of operation thereof is the same as that above described in connection with Figure 1. Thus $a$—$a'$ illustrate the path of the light rays from polarizing field 14 and $b$—$b'$ from polarizing field 13 as they are projected toward the mirror 21 and reflected thereby through the stereoscopic transparency 19 to the observer's eyes when positioned as related above. In this modification, also, as in Fig. 1, the walls 10 of the casing cause the width of the two beams passing through aperture 16 to be restricted so that beam $a$—$a'$ actually has the width of a $a^2$—$a'$ and beam $b$—$b'$ the width of $b$—$b^2$. It will be understood, of course, that in Figure 2 the source 15 may be enclosed within the casing as described in connection with Figure 1.

In Fig. 2, the polarizer will be placed in the focal plane of the focusing means 17—21.

Figure 3:
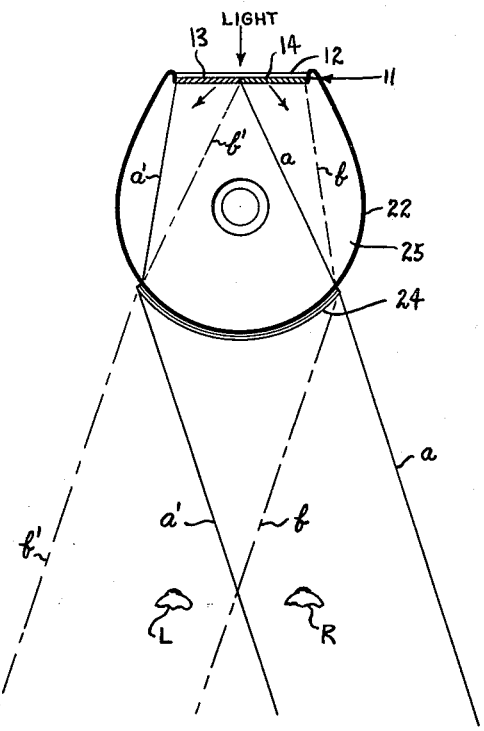
Fig. 3 is a transverse sectional view of a bottle of curvilinear cross section containing a liquid and embodying a polarizer, the focusing means in such case being said liquid.

Among various uses to which my invention may be applied, I have shown in Fig. 3, an advertising device wherein a bottle 22 has embodied in one portion thereof a split-field polarizer 11 having two fields 13, 14, such as already described, or of any other suitable construction. At 23 is represented the cork or closure of a bottle. Disposed upon another portion of the bottle, diametrically opposite the polarizer, is a label 24, picture, or other device in the form of a polarizing stereoscopic transparency. The liquid contained in the bottle preferably should be transparent or, in any event, translucent. The focusing means corresponding to the lens 20 of Fig. 1 will be the liquid 25 contained within the bottle, the portion of which bearing the transparency is curvilinear in transverse section. The light rays from the two polarizing fields 13 and 14 will follow paths through the label 24 similar to those of the modifications shown in Figs. 1 and 2, and in Fig. 3, are illustrated as following paths defined by $a$—$a'$ and $b$—$b'$. It will be obvious that the observer looking at the transparency 24 will see in relief the label, or other image, embodied in the layers thereof.

In Fig. 2, the mirror 21 and lens 17 constitute the focusing means and the transparent or translucent liquid in the embodiment of my invention shown in Fig. 3, is the focusing means.

Having thus described illustrative embodiments of my invention, without, however, limiting the same thereto, what I claim and desire to secure by Letters Patent is:

1. Apparatus for viewing pictures stereoscopically, said apparatus comprising light focusing means and a translucent split field polarizer spaced therefrom and adapted to polarize light when passed therethrough, said polarizer embodying a pair of adjoining polarizing fields whose polarization axes are disposed substantially normal to each other, said fields being divided by a plane passing substantially along the optical axis of the focusing means, and said focusing means having curved surfaces such as to cause the light rays from the respective polarizing fields to emerge from the focusing means as a pair of beams of polarized light with one of said beams being in diverging relation to the other beam, whereby when a film embodying a pair of superimposed light polarizing images in offset relation and having their polarizing axis substantially normal with each other and their respective axes parallel with the axis of polarization of the respective fields of the polarizer is positioned adjacent the focusing means and is viewed by an observer having one eye in the path of one of said respective beams of polarized light and the other eye in the path of the other of said beams at a location along said beams not traversed by the other beam, the said images will appear as a stereoscopic picture.

2. Apparatus for viewing pictures stereoscopically, said apparatus comprising light focusing means and a translucent split field polarizer spaced approximately at the focal plane thereof and adapted to polarize light when passed therethrough, said polarizer embodying a pair of adjoining polarizing fields whose polarization axes are disposed substantially normal to each other, said fields being divided by a plane passing substantially along the optical axis of the focusing means, and said focusing means having curved surfaces such as to cause the light rays from the respective polarizing fields to emerge from the focusing means as a pair of beams of polarized light with one of said beams being in diverging relation to the other beam, whereby when a film embodying a pair of superimposed light polarizing images in offset relation and having their polarizing axis substantially normal with each other and their respective axes parallel with the axis of polarization of the respective fields of the polarizer is positioned adjacent the focusing means and is viewed by an observer having one eye in the path of one of said respective beams of polarized light and the other eye in the path of the other of said beams at a location along said beams not traversed by the other beam, the said images of said film will appear as a stereoscopic picture.

3. Apparatus for viewing pictures stereoscopically, said apparatus comprising a positive lens element and a translucent split field polarizer spaced therefrom at approximately the focal plane of the lens element and adapted to polarize light when passed therethrough, said polarizer embodying a pair of adjoining polarizing fields whose polarization axes are disposed substantially normal to each other, said fields being divided by a plane passing substantially along the optical axis of the lens element, and said lens element having curved surfaces such as to cause the light rays from the respective polarizing fields to emerge from the lens element as a pair of beams of polarized light with one of said beams being in diverging relation to the other beam, whereby when a film embodying a pair of superimposed light polarizing images in offset relation and having their polarizing axis substantially normal with each other and their respective axes parallel with the axis of polarization of the respective fields of the polarizer is positioned adjacent the lens element and is viewed by an observer having one eye in the path of one of said respective beams of polarized light and the other eye in the path of the other of said beams at a location along said beams not traversed by the other beam, the said images will appear as a stereoscopic picture.

4. Apparatus for viewing pictures stereoscopically, said apparatus comprising illuminating means, light focusing means and a translucent split field polarizer intermediate the illuminating means and the light focusing means in spaced relation to the focusing means, said polarizer being adapted to polarize light when passed therethrough and embodying a pair of adjoining polarizing fields whose polarization axes are disposed substantially normal to each other, said fields being divided by a plane passing substantially along the optical axis of the focusing means and said focusing means having curved surfaces such as to cause the light rays from the respective polarizing fields to emerge from the focusing means as a pair of beams of polarized light with one of said beams being in diverging relation to the other beam, whereby when a film embodying a pair of superimposed light polarizing images in offset relation and having their polarizing axis substantially normal with each other and having their respective axes parallel with the axis of polarization of the respective fields of the polarizer is positioned adjacent the focusing means and is viewed by an observer having one eye in the path of one of said respective beams of polarized light and the other eye in the path of the other of said beams at a location along said beams not traversed by the other beam, the said images will appear as a stereoscopic picture.

5. Apparatus for viewing pictures stereoscopically, said apparatus comprising illuminating means, a pair of spaced axially aligned positive lenses, light focusing means and a translucent split field polarizer disposed intermediate the illuminating means and the first lens in spaced relation to the lens, said polarizer being adapted to polarize light when passed therethrough and embodying a pair of adjoining polarizing fields whose polarization axes are disposed substantially normal to each other, said fields being divided by a plane passing substantially along the optical axis of the focusing means, a support for a film disposed intermediate the two lenses and said focusing means having curved surfaces such as to cause the light rays from the respective polarizing fields to emerge from the focusing means as a pair of beams of polarized light with one of said beams being in diverging relation to the other beam, whereby when a film embodying a pair of superimposed light polarizing images in offset relation and having their polarizing axis substantially normal with each other is positioned in said support with their axis parallel with the axis of polarization of one of the respective fields of the polarizer and is viewed by an observer having one eye in the path of one of said respective beams of polarized light and the other eye in the path of the other of said beams at a location along said beams not traversed by the other beam, the said images will appear as a stereoscopic picture, and said second lens having image magnifying characteristics.

JOSEPH MAHLER.

REFERENCES CITED

The following references are of record in the file of this patent:

UNITED STATES PATENTS

| Number | Name | Date |
|---|---|---|
| 1,503,766 | Pictet et al. | Aug. 5, 1924 |
| 1,931,228 | Kitroser | Oct. 17, 1933 |
| 2,165,974 | Land | July 11, 1939 |
| 2,203,687 | Land et al. | June 11, 1940 |
| 2,240,703 | Kober | May 6, 1941 |
| 2,255,631 | Schulman | Sept. 9, 1941 |